(12) United States Patent
Li et al.

(10) Patent No.: US 8,861,423 B2
(45) Date of Patent: Oct. 14, 2014

(54) INTERFERENCE MITIGATION BY OVERHEARING

(75) Inventors: Qinghua Li, Sunnyvale, CA (US); Xintian E. Lin, Mountain View, CA (US)

(73) Assignee: Intel Corporation, Santa Clara, CA (US)

(*) Notice: Subject to any disclaimer, the term of this patent is extended or adjusted under 35 U.S.C. 154(b) by 1000 days.

(21) Appl. No.: 12/016,609

(22) Filed: Jan. 18, 2008

(65) Prior Publication Data

US 2009/0185521 A1    Jul. 23, 2009

(51) Int. Cl.
*H04B 7/14* (2006.01)
*H04L 1/00* (2006.01)
*H04B 1/7107* (2011.01)
*H04J 11/00* (2006.01)
*H04L 1/18* (2006.01)

(52) U.S. Cl.
CPC ............. *H04L 1/0045* (2013.01); *H04L 1/1812* (2013.01); *H04L 2001/0093* (2013.01); *H04B 1/7107* (2013.01); *H04J 11/004* (2013.01); *H04L 2001/0097* (2013.01)
USPC ........... 370/315; 370/328; 370/345; 455/63.1

(58) Field of Classification Search
None
See application file for complete search history.

(56) References Cited

U.S. PATENT DOCUMENTS

| | | | | |
|---|---|---|---|---|
| 7,295,596 B2* | 11/2007 | Misra et al. | ............. | 375/147 |
| 8,213,390 B2* | 7/2012 | Black et al. | ............. | 370/335 |
| 2004/0081124 A1* | 4/2004 | Black et al. | ............. | 370/335 |
| 2006/0229017 A1* | 10/2006 | Larsson et al. | ............. | 455/63.1 |
| 2008/0144552 A1* | 6/2008 | Johansson et al. | ............. | 370/310 |
| 2008/0219222 A1* | 9/2008 | Lo et al. | ............. | 370/337 |
| 2008/0219343 A1* | 9/2008 | Wu et al. | ............. | 375/232 |

OTHER PUBLICATIONS

Office Action Received for Chinese Patent Application No. 200910126800,7, Mailed on Dec. 23, 2011, 3 pages of Office Action and 4 pages of English Translation.

* cited by examiner

*Primary Examiner* — Jae Y Lee
*Assistant Examiner* — Tito Pham
(74) *Attorney, Agent, or Firm* — Cool Patent, P.C.

(57) ABSTRACT

Briefly, in accordance with one or more embodiments in a wireless network, a station may overhear one or more packets that are not necessarily destined for those stations. The overhearing station may decode the data of the packet, and may utilizes the decoded packet to remove a retransmission of that packet in a subsequent time slot and occurring at the same time as the transmission of a packet destined for that station in the same time slot. Such a retransmission of packets may occur for example in relay systems and/or in hybrid automatic repeat request (HARQ) systems. The retransmitted packet may be treated as an interference signal in the total received signal, so that the previously received and decoded packet may be subtracted from the total signal, allowing the desired packet to be decoded from the intended signal.

9 Claims, 8 Drawing Sheets

INTERFERENCE MITIGATION BY OVERHEARING

BACKGROUND

In wireless networks, stations disposed along the propagation path of a transmission may overhear the broadcast information even though the packet may not be addressed to the overhearing station. Such a situation may also occur, for example, in spatial multiplexing systems in which transmissions may occur simultaneously among multiple stations in the same time slot and at the same frequency. Such multiple transmissions may, however, result in interference with intended transmissions by transmissions that are not intended for a given stations. Furthermore, utilization of relay transmissions is capable of increasing both the capacity and reliability of a wireless network. In a wireless network using relays, in the downlink the base station sends a packet to the relay station, and the relay station then forwards the packet to the destination station in a later time slot. When the relay station retransmits the packet, the retransmitted packet can create interference to the base station and prevents the base station from reliably receiving normal uplink data from another station in the same frequency and time location.

DESCRIPTION OF THE DRAWING FIGURES

Claimed subject matter is particularly pointed out and distinctly claimed in the concluding portion of the specification. Such subject matter may, however, be understood by reference to the following detailed description when read with the accompanying drawings in which:

Figure 1:
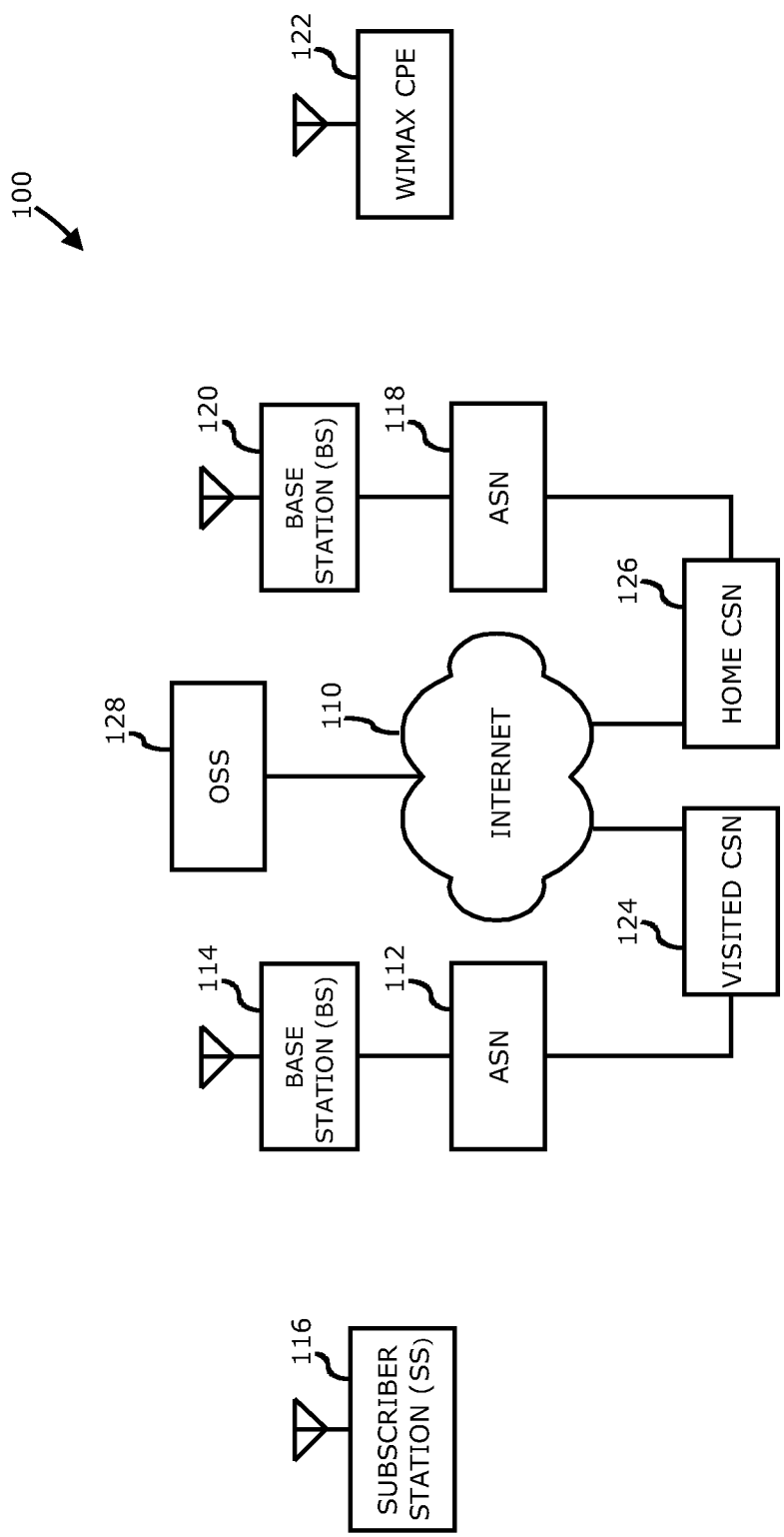
FIG. 1 is a block diagram of a wireless network in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled may, however, also mean that two or more elements may not be in direct contact with each other, but yet may still cooperate and/or interact with each other. For example, "coupled" may mean that two or more elements do not contact each other, but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over" may, however, also mean that two or more elements are not in direct contact with each other. For example, "over" may mean that one element is above another element, but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a wireless network in accordance with one or more embodiments will be discussed. As shown in FIG. 1, network 100 may be an Internet Protocol (IP) type network comprising an Internet 110 type network or the like that is capable of supporting mobile wireless access and/or fixed wireless access to Internet 110. In one or more embodiments, network 100 may be in compliance with a Worldwide Interoperability for Microwave Access (WiMAX) standard or future generations of WiMAX, and in one particular embodiment may be in compliance with an Institute for Electrical and Electronics Engineers 802.16e standard (IEEE 802.16e). In one or more alternative embodiments network 100 may be in compliance with a Third Generation Partnership Project Long Term Evolution (3GPP LTE) or a 3GPP2 Air Interface Evolution (3GPP2 AIE) standard. In general, network 100 may comprise any type of orthogonal frequency division multiple access (OFDMA) based wireless network, and the scope of the claimed subject matter is not limited in these respects. As an example of mobile wireless access, access service network (ASN) 112 is capable of coupling with base station (BS) 114 to provide wireless communication between subscriber station (SS) 116 and Internet 110. Subscriber station 116 may comprise a mobile-type device or information-handling system capable of wirelessly communicating via network 100, for example, a notebook-type computer, a cellular telephone, a personal digital assistant, or the like. ASN 112 may implement profiles that are capable of defining the mapping of network functions to one or more physical entities on network 100. Base station 114 may comprise radio equipment to provide radio-frequency (RF) communication with subscriber station 116, and may comprise, for example, the physical layer (PHY) and media access control (MAC) layer equipment in compliance with an IEEE 802.16e type standard. Base station 114 may further comprise an IP backplane to couple to Internet 110 via ASN 112, although the scope of the claimed subject matter is not limited in these respects.

Network 100 may further comprise a visited connectivity service network (CSN) 124 capable of providing one or more network functions including but not limited to proxy- and/or relay-type functions, for example, authentication, authorization and accounting (AAA) functions, dynamic host configuration protocol (DHCP) functions, or domain name service controls or the like, domain gateways, such as public switched telephone network (PSTN) gateways or Voice over Internet Protocol (VOIP) gateways, and/or Internet Protocol (IP) type server functions, or the like. These are, however, merely example of the types of functions that are capable of being provided by visited CSN or home CSN 126, and the scope of the claimed subject matter is not limited in these respects. Visited CSN 124 may be referred to as a visited CSN in the case, for example, in which visited CSN 124 is not part of the regular service provider of subscriber station 116, for example, in which subscriber station 116 is roaming away from its home CSN, such as home CSN 126, or, for example, in which network 100 is part of the regular service provider of subscriber station, but in which network 100 may be in another location or state that is not the main or home location of subscriber station 116. In a fixed wireless arrangement, WiMAX type customer premises equipment (CPE) 122 may be located in a home or business to provide home or business customer broadband access to Internet 110 via base station 120, ASN 118, and home CSN 126 in a manner similar to access by subscriber station 116 via base station 114, ASN 112, and visited CSN 124, a difference being that WiMAX CPE 122 is generally disposed in a stationary location, although it may be moved to different locations as needed, whereas subscriber station may be utilized at one or more locations if subscriber station 116 is within range of base station 114, for example. In accordance with one or more embodiments, operation support system (OSS) 128 may be part of network 100 to provide management functions for network 100 and to provide interfaces between functional entities of network 100. Network 100 of FIG. 1 is merely one type of wireless network showing a certain number of the components of network 100; however, the scope of the claimed subject matter is not limited in these respects.

Figure 2:
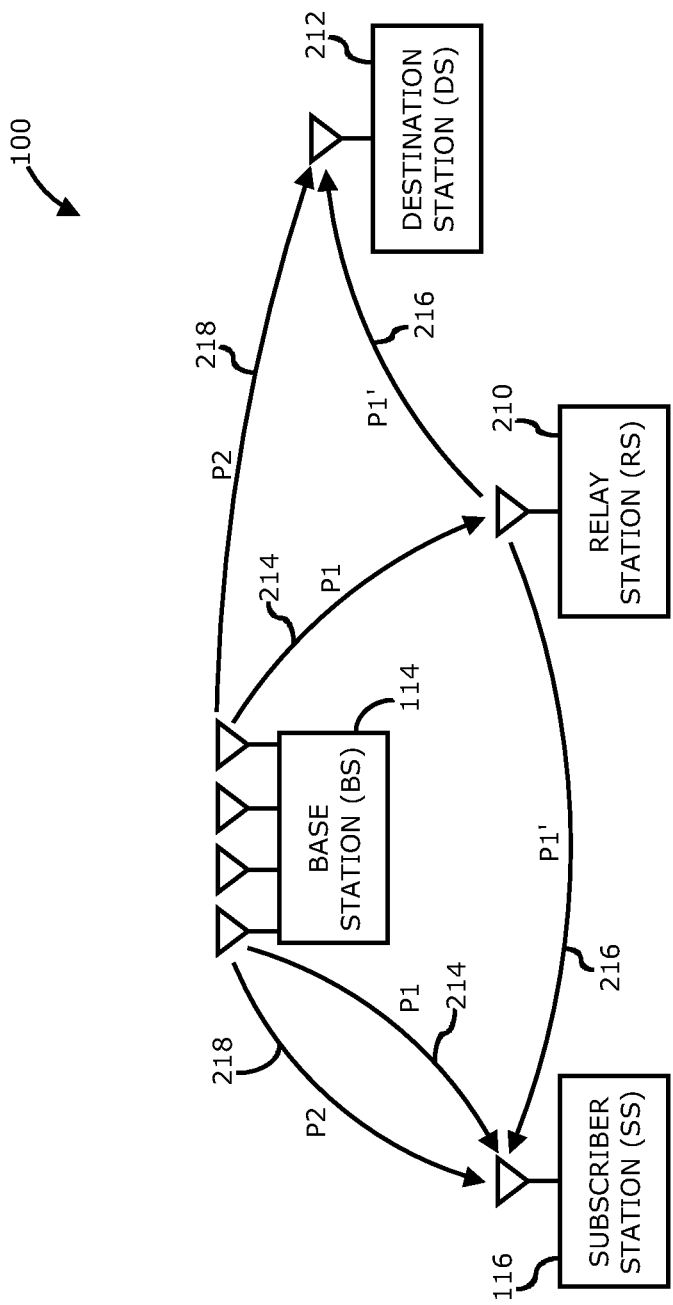
FIG. 2 is a diagram of a wireless network illustrating interference between a relay transmission and a normal downlink transmission in accordance with one or more embodiments.
Figure 3:
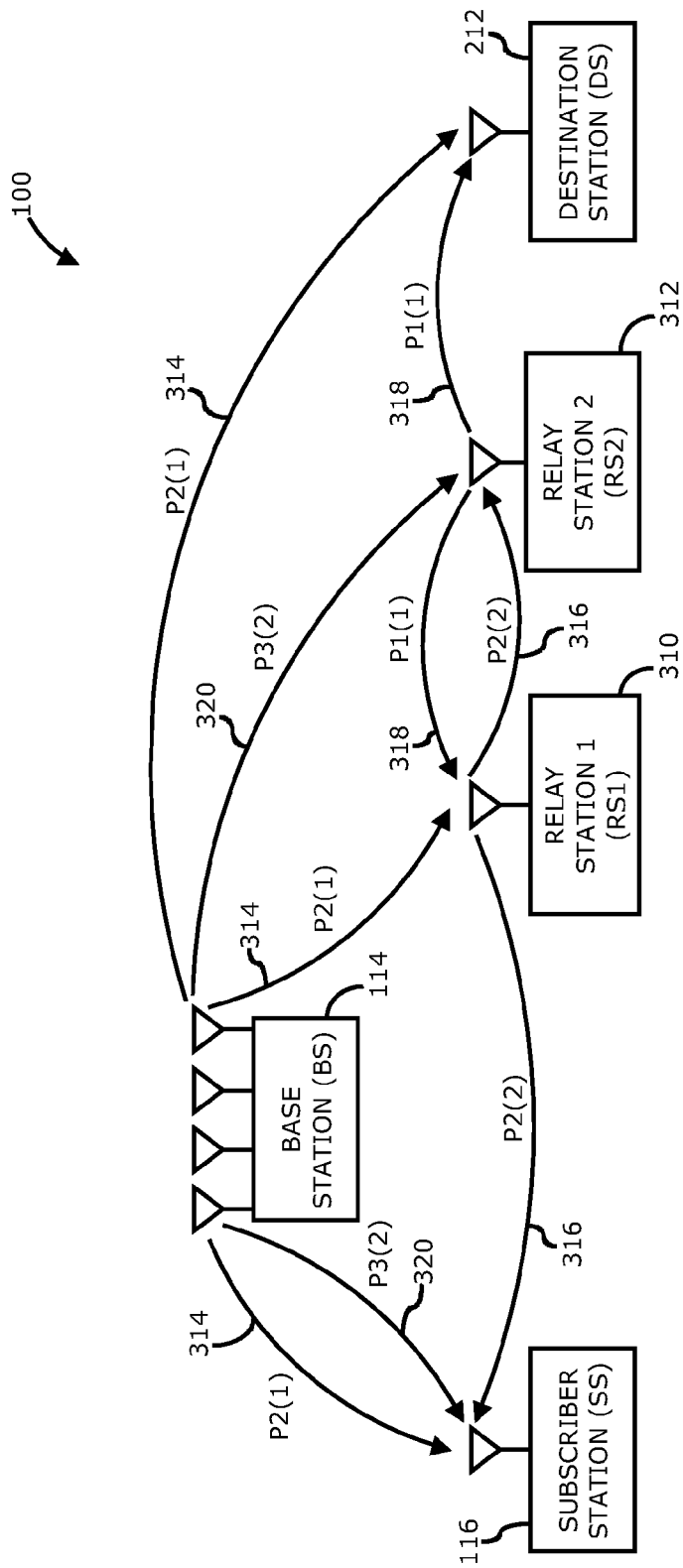
FIG. 3 is a diagram of a wireless network illustrating interference cancellation over a two-hop relay in accordance with one or more embodiments.
Figure 4:
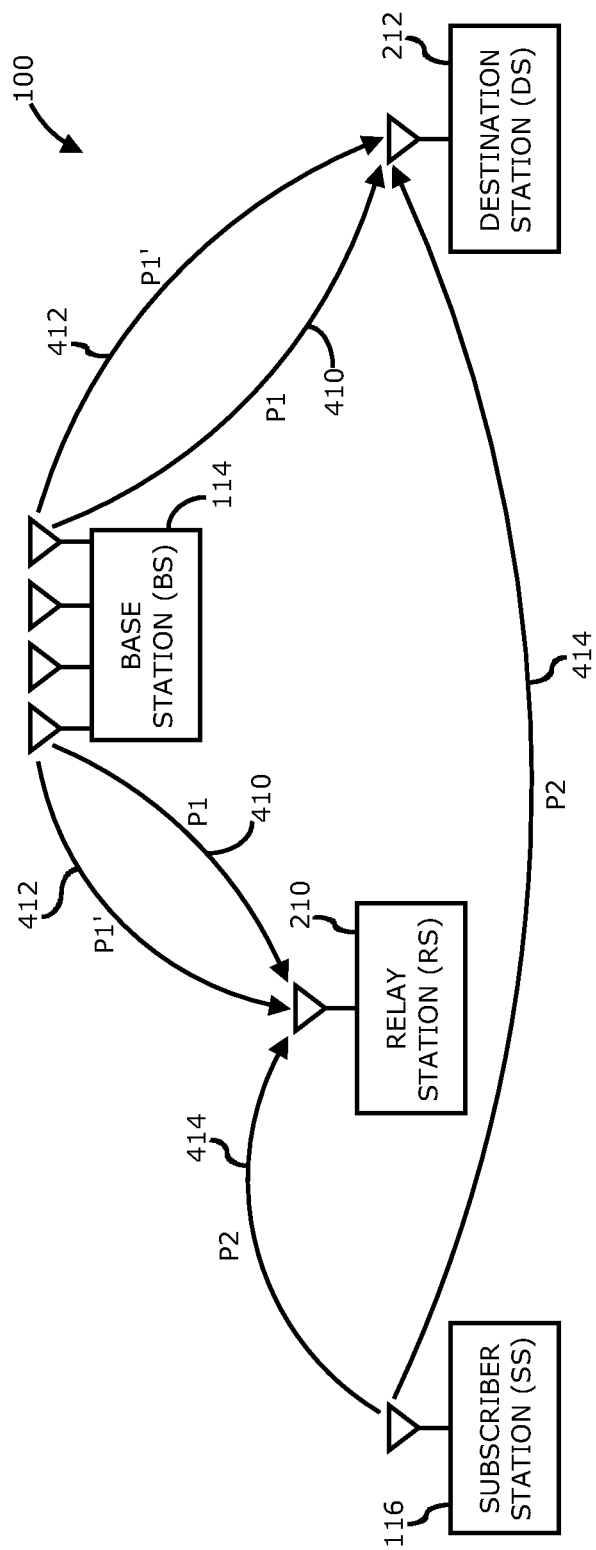
FIG. 4 is a diagram of a wireless network illustrating interference between a HARQ transmission and a relay uplink transmission in accordance with one or more embodiments.

Referring now to FIG. 2, a diagram of a wireless network illustrating interference between a relay transmission and a normal downlink transmission in accordance with one or more embodiments will be discussed. As shown in FIG. 2, wireless network 100 may include base station 114 and subscriber station 116 as shown in and described with respect to FIG. 1, and may further include destination station (DS) 212 and relay station (RS) 210. In one or more embodiments, base station 114 broadcasts a first packet P1 as signal 214 to relay station 210 and also to a scheduled subscriber station 116 in a first time slot. Relay station 210 then forwards packet P1, labeled as packet P1', via signal 216 to destination station 212 in a second time slot. At the same time in the second time slot, base station 114 sends data packet P2 via signal 218 to subscriber station 116. Such an arrangement is capable of increasing the spectrum efficiency via spatial multiplexing. The relayed P1 signal, packet P1' broadcast as signal 216, superimposes packet two's P2 signal 218 at subscriber station 116. Since subscriber station 116 has already received the data of packet P1 in the previous time slot, subscriber station 116 is capable of estimating the channel response between relay station 210 and subscriber station 116, and utilizes the channel response estimate to subtract the signal 216 of packet P1, relayed as P1', from the superimposed signal. Subscriber station 116 is then able to detect the desired packet P2 in signal 218. Because destination station 212 receives a relative weak version of signal 218 from base station 114, since destination station 212 is utilizing relay station 210, packet P2 signal 218 sent by base station 114 may cause little or no interference at destination station 212 for the reception of packet P1 in the second frame compared with the packet P1' via signal 216 from relay station 210. Such an arrangement may be generalized to multihop systems as shown in FIG. 3, below, and/or to hybrid automatic repeat request (HARD) type systems as shown in FIG. 4, below.

Referring still to FIG. 2, in one or more embodiments, if subscriber station 116 already knows the data in the interference signal 216 broadcast from relay station 210, then the interference signal 216 may be subtracted from the received signal, signal 218, for signal enhancement. For example, when receiving superimposed signals comprising the desired signal, signal 218, and the interfering signal, signal 216, subscriber station 116 is capable of estimating the channel response of the interfering signal, signal 216, using the known data based on receiving packet P1 via signal 214 in the previous frame by "overhearing" signal 214 in the first frame even though packet P1 is not intended for subscriber station 116, reconstructing the interfering signal, and then subtracting the interfering signal, signal 216, from the superimposed signal. As a result, subscriber station 116 is capable of detecting the desired signal, signal 218, as if there were no interference from signal 216. Wireless network 100 is capable of implementing such an overhearing, estimation, and cancellation technique to increase capacity. For example, in the downlink, subscriber stations disposed near base station 114 may overhear signals broadcast to other stations. The overheard signal may be utilized by such nearby subscriber stations to cancel interference that may be generated in a subsequent frame in the event the data in the overheard signal is sent again, for example, if relayed by one or more relay stations 210, becoming interference. Such data retransmission may also occur in HARQ-type systems. By removing such interference, superposition of signals in the same frames, spatial multiplexing, to increase the throughput of network 100.

As shown in FIG. 2, interference cancellation may be conducted at one or more subscriber stations 116 in which one or more relay stations 210 are utilized to forward downlink packets received from base station 114 to one or more destination stations 212. In particular, in the first time slot, base station 114 sends packet P1 to relay station 210 via signal 214. The intended final destination of packet P1 is destination station 212. Packet P1 broadcast as signal 214 is overheard by subscriber station 116 disposed in the vicinity of base station 114. Subscriber station 116 then decodes packet P1 and is capable of cancelling the interference related to the retransmission of packet P1 as packet P1' sent by relay station 210 in the next time slot as signal 216. Subscriber station 116 may acknowledge to base station 114 the successful decoding of packet P1. Such an acknowledgement may assist with scheduling at base station 114. For example, base station 114 may designate one or multiple subscriber stations 116 for overhearing. Base station 114 may then select one or more subscriber stations 116 as the next station to receive an intended packet from those subscriber stations 116 that acknowledged to base station 114 the successful decoding of overheard packets.

After transmitting packet P1 in the first time slot, base station 114 schedules that relay station 210 may forward packet P1 to destination station 212 in the next time slot, and base station 114 may simultaneously send packet P2 to subscriber station 116 in the next time slot. In the next time slot, relay station 210 transmits a relay packet P1', the relayed version of packet P1, to destination station 212 via signal 216, and base station 114 transmits packet P2 to subscriber station 116 via signal 218. Although the information, or bits, in the relayed packet P1' and packet P1 are the same, it should be noted that the forward error correction (FEC) code bits and/or transmission parameters, for example, the modulation order and/or code rate and/or space-time code, may be different for packet P1 and its relayed packet P1'. In addition, the relay station may extract the information bits of the packets received from base station 114 and generate new packets using the same information bits. For example, fragmentation may be applied at relay station 210. As long as the information bits are overheard by subscriber station 116, the interference cancellation can be applied. As a result of simultaneous transmission of packet P1 and relay packet P1', signal 218 and signal 216 are superimposed as a signal received by subscriber station 116. Since subscriber station 116 has previously received information about P1 from signal 214, subscriber station 116 estimates the channel response over the link from relay station 210 to subscriber station 116 using the information in packet P1, computes packet P1' using the decoded information and channel response, and then subtracts the interference of signal 216 from the superimposed received signal. Subscriber station 116 is then capable of decoding packet P2 after the interference signal 216 is sufficiently reduced or removed from the superimposed received signal. Signal 216 and signal 218 may likewise superimpose in the signal received at destination station 212. The link from relay station 210 to destination station 212, however, may have a better quality than the link from base station 114 to destination station 212 when relay station 210 is utilized by base station 114 via base station routing and scheduling. Thus, any interference from signal 218 is relatively weak with respect to signal 216, and does not impact the ability of destination station 212 to decode packet P1' from signal 216. Such an arrangement of relative weakness of signal 218 with respect to signal 216 may be facilitated via power control at relay station 210 and/or base station 114 in addition to control via routing and scheduling. As a result, destination station 212 is capable of decoding packet P1' from signal 216 broadcast by relay station 210, although the scope of the claimed subject matter is not limited in this respect. A multihop relay arrangement of wireless network is shown in and described with respect to FIG. 3, below. The signals in the first and second time slots may not overlap in frequency, but the signals in the second time slot T2 at least partially overlap in frequency. The frequency overlapping causes the interference.

The scheme depicted above employs one-shot hard detection and cancellation. Namely, subscriber station 116 decodes the information bits in packet P1 and quantizes the decoded information into binary bits. The bits may then employed as pilots in estimating the channel from relay station 210 to subscriber station 116. After the channel is estimated, the bits are employed to regenerate packet P1' and the signal of P1' is convolved with the estimated channel to reconstruct the interference. The reconstructed interference is removed from the superimposed signal in time slot T2 at subscriber station 116. Finally, the desired packet P2 may be decoded. This sequential one-shot process may provide lower complexity in computation and storage. Such a one-shot process may further implement soft cancellation and/or the joint data detection of P1 and P2. In addition, the joint data detection and/or channel estimation over the channels and signals on 214, 216, and 218 may be utilized to achieve an optimal performance at higher complexities, although the scope of the claimed subject matter is not limited in these respects.

In one or more embodiments, soft cancellation may exploit the likelihood information obtained from the interference. For example, the signal 216 may utilize binary phase-shift keying (BPSK). Node 116 computes the likelihood about a codebit in 216 from the overheard 214. The likelihood indicates that the codebit symbol is to be +1 with probability 0.7 and −1 with probability 0.3. The codebit symbol may be quantized to +1 when hard detection and cancellation are employed. Therefore, some information may be lost and errors may be generated because the true −1 may be converted to +1 with probability 0.3. For soft cancellation, confidence information may be retained and utilized. For example, the averaged symbol (+1)*0.7+(−1)*0.3=0.4 may be computed and subtracted from the superimposed signal, however, the scope of the claimed subject matter is not limited in these respects.

In one or more embodiments, joint detection may involve iterative decoding of P1 and P2, for example, as used in Turbo code decoding, multiuser detection, and/or multiple-input, multiple-output (MIMO) decoding. Log-likelihood ratios of codebits or coded symbols may be exchanged among decoding processes. Joint detection may be utilized if P1 can not be correctly decoded in time slot T1. The joint data detection and channel estimation may be implemented in which channel estimation and channel code decoding may help each other iteratively. For a simpler implementation without exchanging log-likelihood information, subscriber station 216 may decode P1 in T1 and have knowledge that the decoding is not successful because the cyclic redundancy check (CRC) check may not pass. Subscriber station 116 may store the received signal of P1 for an iterative process. The decoded bits with errors may be treated as the true bits and utilized to regenerate transmitted signal of P1'. The regenerated signal may be utilized as channel training symbols to estimate the channel response from relay station 210 to subscriber station 116. Although the regenerated signal may have errors, the power of errors may be relatively small compared to the power of the regenerated signal. Therefore, the regenerated signal may still be useful. Interference cancellation may be conducted using the estimated channel and regenerated signal. Packet P2 may then decoded. If the decoding is successful, for example the CRC check is passed, the process stop at that point. Otherwise, if an error is detected in the decoded P2 information bits, the decoded bits of packet P2 may be exploited to facilitate the decoding of P1, which in turn facilitates back the decoding of P2. The decoded bits of P2 may be treated as the true bits to regenerate the transmitted signal of P2, and the received signal of P2 may be generated using the regenerated signal and the estimated channel response from base station 114 and subscriber station 116. The received signal of P2 may then be removed from the superimposed signals of 218 and 216. After the incomplete cancellation of P2's signal, the remaining signal and the stored signal of 214 may be jointly utilized to decode the data in P1 and P1', which share the same information bits. The decoded information bits of P1 may then be used in channel estimation and interference cancellation for P2 iteratively, although the scope of the claimed subject matter is not limited in these respects.

In one or more alternative embodiments, node 116 may combine the signals 214 and the superimposed signal received in time slot T2 to enhance the decoding of the information bits in P1 and/or P1' as follows. If the initial decoding of P1 using 214 fails, the log-likelihood ratios of the codebits of P1 are stored. The decoded information bits may be treated as the true bits and used in estimating channel response in 216. After the channel is estimated, log-likelihood ratios of the codebits of P1's may be computed. The log-likelihood ratios of the corresponding codebit in P1 and P1' are combined, for example, added together. The combined log-likelihood ratios may then used to decode the information bits in P1 again. The combining enhances the decoding of P1. Thus, in one or more embodiments, even if the initially overheard packet was not correctly received, the received information may still be utilized for soft-cancellation and/or joint detection with additional complexities. Such techniques may be implemented in one or more embodiments, and may mitigate and/or remove the need of correct overhearing, however, the scope of the claimed subject matter is not limited in these respects.

Referring now to FIG. 3, a diagram of a wireless network illustrating interference cancellation over a multihop relay in accordance with one or more embodiments will be discussed. As shown in FIG. 3, relay arrangement of wireless network 100 utilizing overhearing as shown in FIG. 2 is capable of being extended to a multihop relay channel in which multiple simultaneous relay transmissions may be utilized. In one or more embodiments, base station 114 operates as a source node and transmits a packet that is sequentially forwarded to destination station 212 via multiple relay stations, such as a first relay station (RS1) 310 and a second relay station (RS2) 312, as shown in FIG. 3. If base station 114, relay station 310 and relay station 312 know the transmission schedule, then any station that correctly received a given packet is capable of cancelling interference caused by the forwarding of that packet in one or more subsequent frames. Even if the given packet was not correctly received, the received information can still be utilized for the soft-cancellation or joint detection with additional complexities. As shown in FIG. 3, the notation $P_i(t)$ denotes the i-th packet sent at time slot t. The transmitted signals of $P_i(t)$ and $P_i(t+n)$, in which n is an integer, may be different, for example, in terms of modulation and/or coding, while at least part of the information in the packets is the same. In the example shown in FIG. 3, base station 114 transmits two packets, $P_1$ and $P_2$, to destination station 212 and one packet, $P_3$, to subscriber station 116 in two time slots. It is assumed that $P_1$ is already in relay station two 312 due to the previous transmissions. Relay station one 310 and relay station two 312 forward packet $P_1$ and packet $P_2$ sequentially as BS→RS1→RS2→DS. In addition, relay station one 310 and relay station two 312 buffer the data of the received or forwarded packet for interference cancellation.

In time slot 1, base station 114 transmits a new packet $P_2$ to relay station one 310 via signal 314. Relay station two 312 sends an older packet $P_1$ to destination station 212 via signal 318, as the data of $P_1$ was received at relay station two 312 in a previous time slot and stored in relay station two 312. The two transmissions of signals 314 and 318 spatially overlap to increase spectrum efficiency. Destination station 212 receives superimposed signals 314 and 318 received from base station 114 and relay station two 312, respectively. Both signals may contain useful information for destination station 212. Destination station 212 may not be able to correctly decode packet $P_2(1)$ for the following reason. The link between base station 114 and relay station one 310 may have a relatively higher quality and the information rate in packet signal 314 may be higher than the capacity of the link between base station 114 and destination station 212. As a result, an efficient decoding strategy for destination station to be able to decode packet $P_2(1)$ may be as follows. Destination station 212 decodes packet $P_1(1)$ transmitted by relay station two 312 over a higher quality channel between relay station two 312 and destination station 212, and treating signal 314 as interference. After $P_1(1)$ is decoded, signal 318 may be subtracted from the superimposed signal received by destination station 212 to arrive at signal 314. Thus, packet $P_2(1)$ may be obtained from signal 314 and stored for signal combining in the detection of a signal carrying packet $P_2(1)$ in time slot 3. For simplicity of implementation, destination station 212 may not want to store the signal having packet $P_2(1)$. Base station 114 may want to minimize the interference of $P_2(1)$ at destination station 212 using multihop relays. As the number of hops increases, the interference power from base station 114 to the destination station 212 decreases, although the scope of the claimed subject matter is not limited in this respect.

In time slot 1, relay station 310 also receives superimposed signals 314 and 318 from base station 114 and relay station two 312, respectively. Since relay station one 310 has previously received the data of packet $P_1(1)$ from base station 114, decoded packet $P_1(1)$ and forwarded it to relay station two 312, relay station one 310 is capable of subtracting $P_1(1)$ from its total received signal. Signal 314 of packet $P_2(1)$ is thereby obtained, and relay station one 310 is capable of decoding packet $P_2(1)$.

Further in time slot 1, subscriber station 116 receives signal 314 and decodes packet $P_2(1)$ for interference mitigation in the next coming time slot. Such reception of signal 314 may be designated and scheduled by base station 114, and then subscriber station 116 may acknowledge to base station 114 if subscriber station 116 successfully decodes packet $P_2(1)$.

In time slot 2, relay station one 310 forwards the received data in packet $P_2(1)$ to relay station two 312 using signal 316 to transmit packet $P_2(2)$. Simultaneously, base station 114 transmits data packet $P_3(2)$ to subscriber station 116 via signal 320. Relay station two 312 receives signal 320 as interference from base station 114. Since the packet $P_3(2)$ has not been previously decoded by relay station two 312, no interference cancellation will be applied. To account for such a situation, base station 114 may select relay station two 312 whose interference from base station 114 is relatively small. Since relay station one 310 may have a better channel to relay station two 312 than the channel from base station 114 to relay station two 312, RS2 can decode packet $P_2(2)$ via signal 316 received from relay station one 310 by treating signal 320 from base station 114 as interference.

Also occurring in time slot 2, subscriber station 116 receives signal 316 from relay station one 310 as interference, and desired signal 320 from base station 114. Because subscriber station 116 knows the packet $P_2(2)$ of signal 316 as packet $P_2(1)$ of signal 314 received from base station 114 in time slot 1, subscriber station 116 is capable of canceling the interference due to signal 316, and then decoding packet $P_3(2)$. It should be noted that the two-hop relaying arrangement of wireless network 100 may be extended to any number of relay hops, and the scope of the claimed subject matter is not limited in this respect. Furthermore, in one or more embodiments wireless network may be capable of interference mitigation via overhearing in which retransmissions may occur, for example in a HARQ-type system as discussed with respect to FIG. 4, below.

Referring now to FIG. 4, a diagram of a wireless network illustrating interference between a hybrid automatic repeat request (HARQ) transmission and a relay uplink transmission in accordance with one or more embodiments will be discussed. Interference cancellation via overhearing as shown in and described with respect to FIG. 2 and/or FIG. 3 likewise may be utilized in conjunction with a HARQ-type system since the HARQ retransmissions contain the information known to the stations in the vicinity of the transmitter. An example of such a HARQ system is shown in FIG. 4 in which relay station 210 forwards uplink packets received from subscriber station 116. As shown in FIG. 4, base station 114 transmits packet P1 to destination station 212 via signal 410. Signal 410 is overheard by relay station 210 since relay station 210 is located in the vicinity of base station 114. As discussed herein with respect to FIG. 2 and/or FIG. 3, relay station 210 may decode packet P1 and thereby have the capability to cancel any interference from retransmission of packet P1 in subsequent time slots. In a HARQ system, if destination station 212 does not correctly receive signal 410 and/or decode packet P1, base station 114 transmits packet P1' to destination station 212 via signal 412 in which packet P1' is computed from the data of packet P1, and in which P1' may contain additional code bits of a forward error correction (FEC) codeword in P1.

During such a HARQ process, if relay station 210 acknowledges to base station 114 that packet P1 is correctly received and decoded, base station 114 knows that relay station 210 is capable of cancelling interference resulting from signal 412, and schedules relay station 210 to receive packet P2 from subscriber station 116 via signal 414 in the uplink. Such an transmission of packet P2 may be an uplink relay packet sent by subscriber station 116 that may be disposed relatively far from base station 114 so that relay station 210 may be utilized as a relay between subscriber station 116 and base station 114. During such an uplink, relay station 210 receives packet P2 from subscriber station 116 via signal 414, and also receives signal 412 from the HARQ transmission of packet P1' from base station 114 as interference. Since relay station 210 correctly received packet P1 in a previous time slot, relay station 210 is capable of computing P1', subtracting the interference of P1' from the total received signal, and then decoding P2. It should be noted that the example shown in FIG. 4 is merely one example of interference mitigation via overhearing in a wireless network 100 in which retransmissions may be utilized, such as in a HARQ-type system, and the scope of the claimed subject matter is not limited in this respect.

In the example wireless network 100 shown in and described with respect to FIG. 2, FIG. 3, and FIG. 4, the station that correctly overheard a packet may acknowledge the reception of such an overheard packet to base station 114. Acknowledgment of the overheard packet by the stations is capable of assisting base station 114 with scheduling of subsequent transmissions with ability to implement spatial multiplexing. In one or more embodiments, base station 114 may designate one or more stations to receive a transmission, even though the transmission may be destined for only one or a certain number of the stations and the other stations may receive the transmitted packet for purposes of interference mitigation and/or cancellation in a subsequently occurring time slot. Since a given subscriber station 116 typically may experience a greater number of receive chains than transmit chains, the station conducting interference cancellation in the schemes described, above, optionally may utilize linear techniques such as minimum mean square error (MMSE) and/or zero-forcing to null out interference which may be implemented at a lower complexity. The station may learn the channel response of the interference and form a null pointing to the interference direction so that detecting and/or buffering of an interference packet may not be required, although the scope of the claimed subject matter is not limited in this respect.

Figure 5:
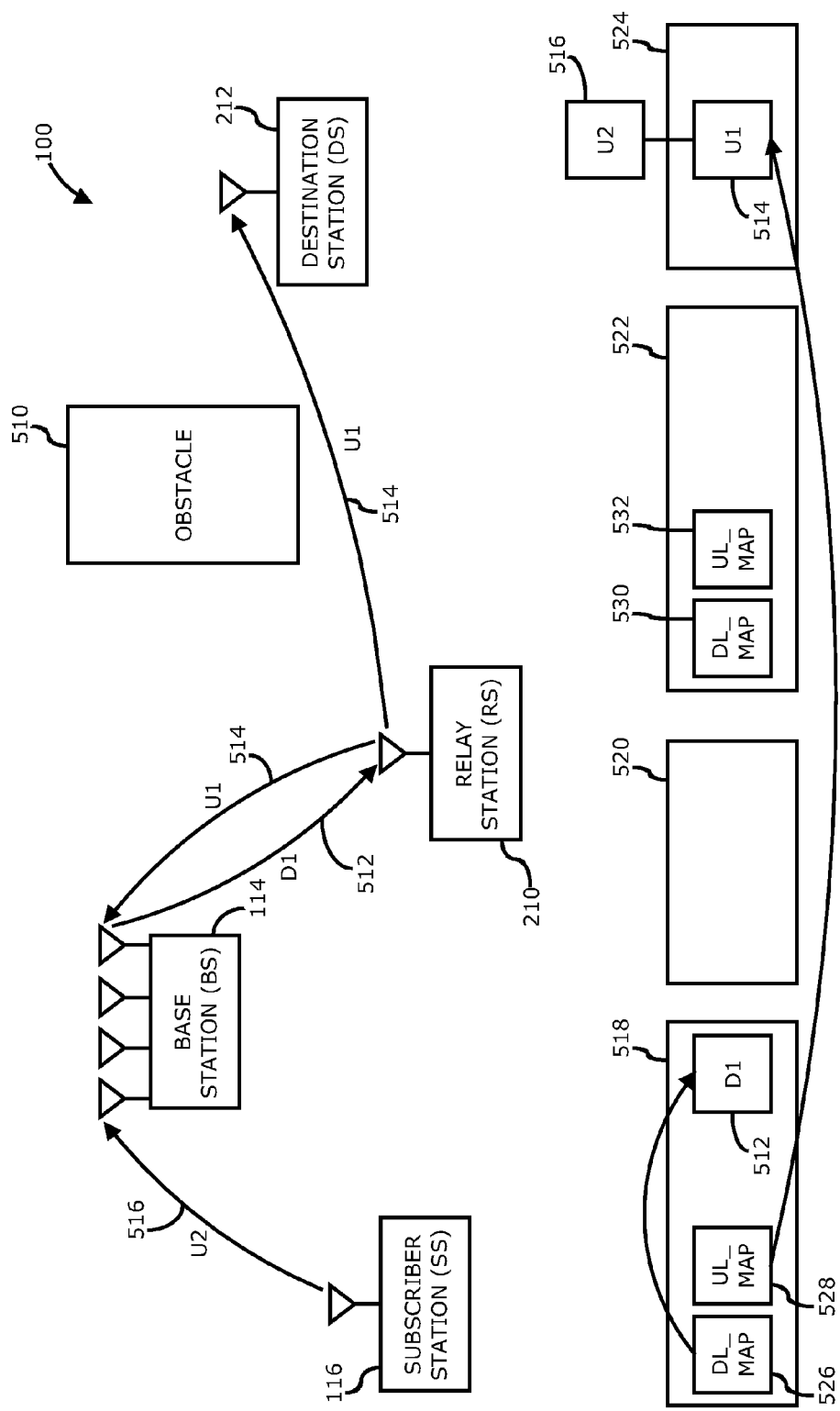
FIG. 5 is a diagram of a wireless network illustrating interference between a relay transmission and a normal uplink transmission in accordance with one or more embodiments.

Referring now to FIG. 5, a diagram of a wireless network illustrating interference between a relay transmission and a normal uplink transmission in accordance with one or more embodiments will be discussed. In one or more embodiments, interference mitigation via overhearing may be implemented from the base station 114. Since base station 114 knows the relay data transmitted by relay station 210, base station 114 may treat the relay signal as channel training symbols, and use the symbols to estimate the interference channel response. After obtaining the channel response, interference from relay station 210 may be removed from the signal received at base station 114, and the uplink signal may be detected. Such an arrangement may be implemented as shown in FIG. 5 as follows. Base station 114 first transmits downlink data D1 via signal 512 to relay station 210 in time slot 1 in downlink subframe 518, and then relay station 210 forwards the downlink data D1 to destination station 212 in a later time slot, time slot 2, for example, in uplink subframe 524. Relay station 210 may be utilized, for example, in which direct transmissions from base station 114 to destination station 212 may be impeded by on obstacle 510. Relay station 210 may comprise, for example, a subscriber station or a relay base station. The relay transmission in time slot 2 is scheduled in a normal uplink subframe 524, in which uplink transmission from another subscriber station may occur. The uplink transmission may be interfered with by the relay transmission when the transmissions are in the same frequency-time location. This is illustrated in FIG. 5 in which D1 is the initial downlink transmission to relay station 210, uplink data U1 514 is the relay transmission by relay station 210 via signal 514, and uplink data U2 516 is the normal uplink transmission from subscriber station 116 via signal 516 in uplink subframe 524. Downlink maps 526 and 530 are used to define access to downlink information. Likewise, uplink maps 528 and 532 allocate access to the uplink channels. The relay transmission from signal 514 causes interference at base station 114 because base station 114 is only interested in receiving the uplink transmission from subscriber station 116 but not the relay transmission from relay station 210. Base station 114 is capable of cancelling the interference from the relay transmission as discussed herein. In one embodiment of interference cancellation, base station 114 may utilize a linear detector, such as minimum mean square error (MMSE) and/or zero-forcing to cancel the interference from relay station 210, which may be similar to the reception in uplink spatial-division multiple access (SDMA).

In one or more embodiments, interference cancellation may be implemented via a non-linear technique. The data in the relay transmission is already known at base station 114 because the data was previously transmitted by base station 114 in a former time slot. If base station 114 also knows the transmission parameters, such as modulation and/or coding scheme and the channel response from relay station 210 to base station 114, base station 114 may be capable of at least partially or completely regenerating the interference signal caused by the transmission of relay data U1 and cancel the interference from the relay signal. A scheme for implementing such cancellation may be as follows.

Base station 114 specifies the transmission parameters, for example, modulation and/or coding scheme, power level, space-time coding, spatial multiplexing, frequency-time location, and so on, for the relay transmission. Base station 114 then estimates the channel response between relay station 210 and base station 114. Since the transmission parameters and data are already known at base station 114, the relayed frame, packet and/or symbols may be treated as a channel training signal with known data, which may result in increased channel estimation accuracy by a factor of six even under the interference from the normal uplink transmission. If some transmission parameters are unknown at base station 114, base station 114 still may estimate the channel response as follows. Since the set of transmission parameters is relatively small, base station 114 may step through the possible parameters if some parameter of the relay such as modulation order is unknown at base station 114. For example, if the modulation order is unknown, base station 114 may assume that the modulation order is quadrature phase-shift keying (QPSK), 16 quadrature amplitude modulation (QAM), or 64 QAM, respectively, and then may estimate the channel response, respectively. One of the three resulting channel estimates may result in a maximum, or near maximum, in the likelihood function of the channel response, and base station 114 may select that channel response and the corresponding modulation order for the next step. Similarly, base station 114 may estimate the channel response over a set of unknown parameters and then select a channel estimate that results in a maximum, or near maximum, in the likelihood function of channel response. Base station 114 then regenerates the relay signal from the estimated channel response and reconstructed transmitted signal that is computed from the known data and transmission parameters. Base station 114 then subtracts the relay signal from the received signal, and then base station 114 detects the normal uplink signal 516 from the canceled interference signal, and the uplink data U2 may be decoded from uplink signal 516.

In one or more embodiments, relay station 210 is fully controlled by base station 114 so that base station 114 knows exactly the transmission parameters and does not need to estimate the transmission parameters, and thereby reducing complexity. In such an arrangement, relay signals transmitted by relay station 210 may be treated as instructed transmission, and the relay scheme may be referred to as instructed relay. Base station 114 may be considered to extend its radio to relay station, and/or to borrow the radio transmitter of relay station 210, although the scope of the claimed subject matter is not limited in this respect.

Figure 6:
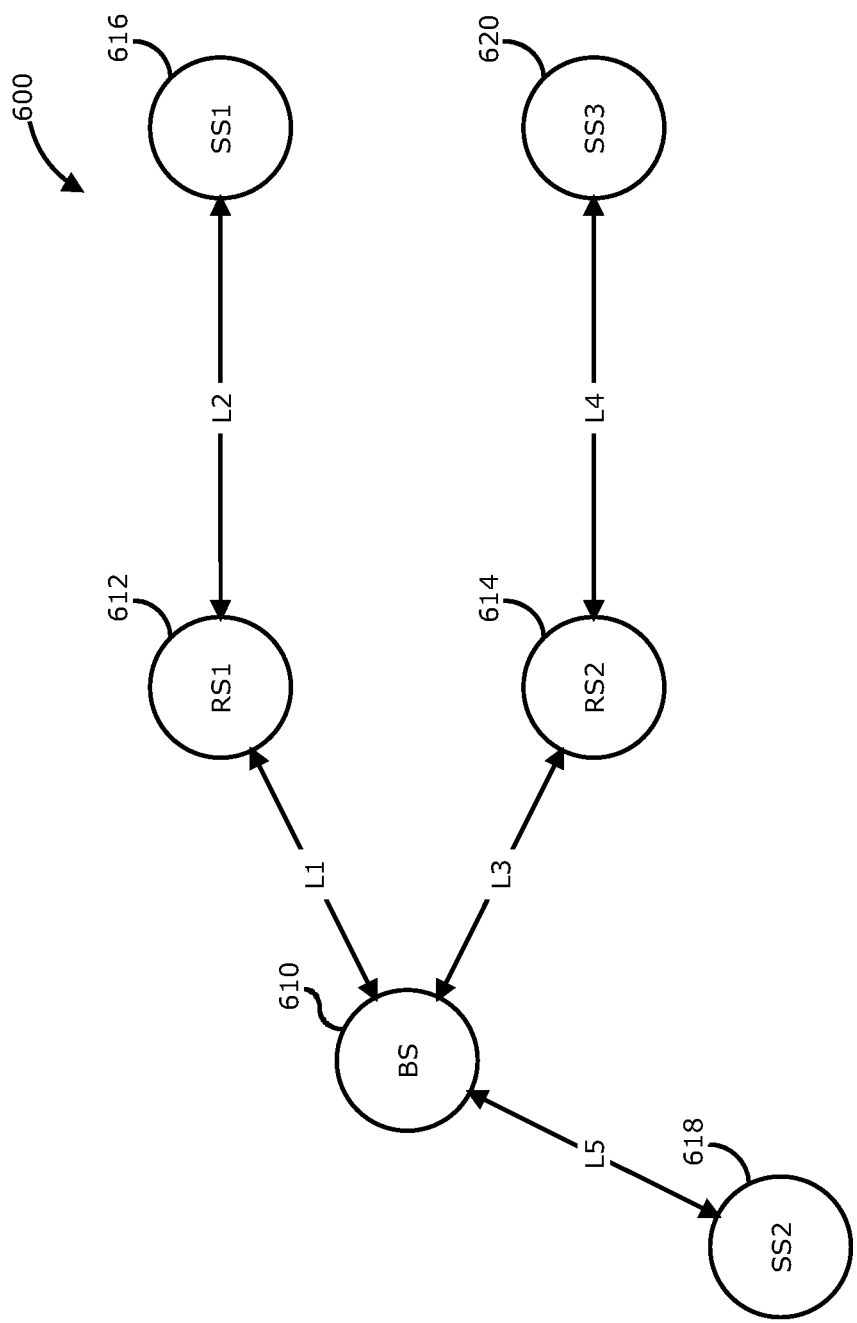
FIG. 6 is a diagram of a wireless network in which one or more subscriber stations are replaced by one or more relay stations in accordance with one or more embodiments.

Referring now to FIG. 6, a diagram of a network in which one or more subscriber stations are replaced by one or more relay stations in accordance with one or more embodiments will be discussed. In one or more embodiments, the subscriber station 116 for example as shown in FIGS. 2, 3, 4, and 5 need not be limited to be a subscriber station. Instead, subscriber station 116 may be replaced by a relay station in some embodiments. For example, as shown in network 600 of FIG. 6, there is one base station, two relay stations (RS1) 612 and (RS2) 614, and three subscriber stations (SS1) 616, (SS2) 618, and (SS3) 620. The three subscriber stations 616, 618, and 620 may be served by base station 610 and the two relay stations 612 and 614, respectively. Each of the relay stations 612 and/or 614 is capable of performing the interference mitigation in receiving data from base station 610, and base station 610 is capable of conducting interference mitigation in receiving data from each of the relay stations 612 and/or 614. For example, base station 610 may sends a packet P1 to relay station 612 in a first time slot, which may be overheard by relay station 614. In a second time slot, relay station 614 sends a second packet P2 to base station 610, and relay station 612 may forward packet P1' to subscriber station 616. Base station 610 can cancel interference of P1'. Relay station 612 and relay station 614 can overhear each other's data transmitted by base station 610, and each relay station 612 and/or 614 is capable of canceling interference caused by the relay transmission by the other relay transmission while receiving data from base station 610 and/or or its client station, for example, subscriber station 616 of relay station 612 and/or subscriber station 620 of relay station 614. Network 600 is, however, an example of one implementation of interference mitigation by overhearing wherein various other arrangements may likewise be implemented, and the scope of the claimed subject matter is not limited in this respect.

Figure 7:
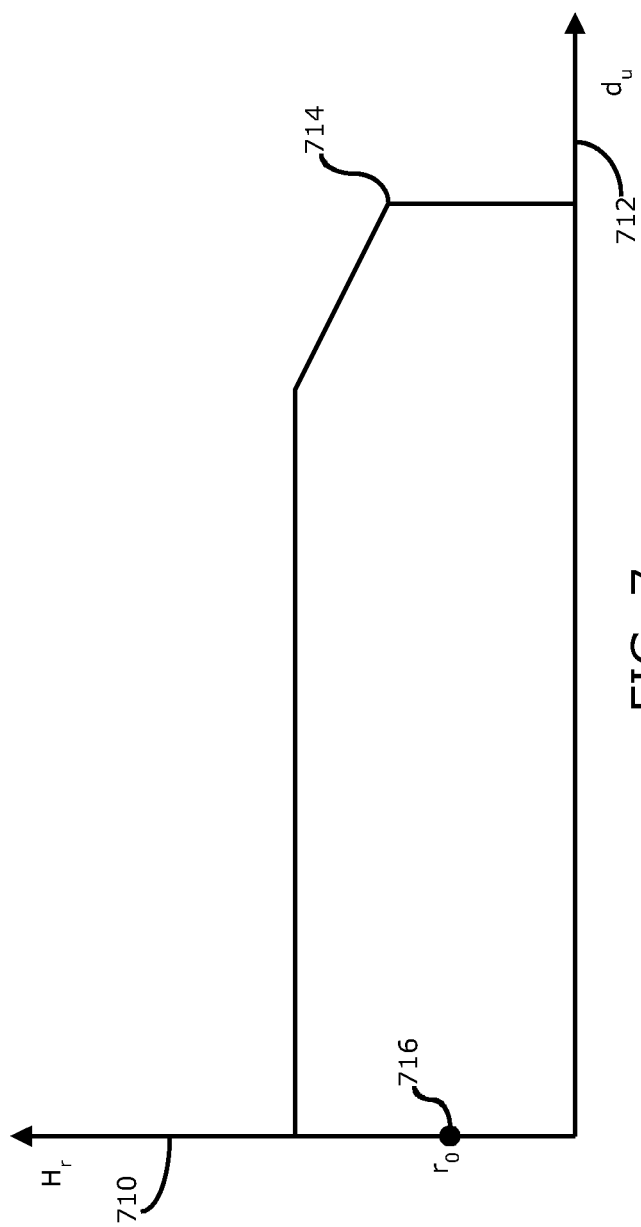
FIG. 7 is a graph of a multiple access channel signal model illustrating the maximization of the information rate via cancellation in accordance with one or more embodiments.

Referring now to FIG. 7, a graph of a multiple access channel signal model illustrating the maximization of the information rate via cancellation in accordance with one or more embodiments will be discussed. The estimation by base station 114 of the interfering channel from relay station 210 to base station 114 should be sufficiently accurate to achieve successful cancellation of the relay signal. The estimation may be subject to interference from normal uplink transmission and/or noise. The accuracy of the estimation may also depend on the channel variation rate. Base station 114 may control the power level of the uplink transmission to facilitate the channel estimation. The baseband signal model of the received signal is:

$$y = H_r d_r + H_u d_u + n$$

in which y is the received signal vector, $H_r$ is the channel matrix between the relay and the base station, $H_u$ is the channel matrix between the uplink station and the base station, $d_r$ is the transmitted relay signal vector, $d_u$ is the transmitted uplink signal vector, and n is the noise vector. Axis 710 represents information rate in $H_r$ and axis 712 represents information rate in $d_u$. Channel matrix $d_r$ is known and $H_r$ is the unknown under estimation. The combined vector, $H_u d_u + n$, is treated as one noise vector with a certain covariance matrix. Then, the accuracy of $H_r$ can be estimated for a given channel estimation scheme or be bounded by the Cramer-Rao lower bound. Base station 114 can control the power level of $d_u$ to achieve targeted estimation accuracy. In general, the signal model of the above equation may be referred to as the multiple access channel (MAC), in which $H_r$ and $H_u$ are assumed known and $d_r$ and $d_u$ are unknown of interest. The achievable data rate pair of $d_r$ and $d_u$ forms a pentagon region. Similarly, achievable region of $H_r$ and $d_u$ may be computable by assuming $d_r$ and $H_u$ are assumed known and $H_r$ and $d_u$ are unknown of interest. If the channel $H_r$ varies too fast or $d_u$ contains too much data, the detection of the desired data $d_u$ cannot be successful even with the most complex joint detection, which is illustrated in FIG. 7. The uplink data rate is maximized at the 714, where the simple cancellation scheme above achieves the maximum rate. If the channel varies fast, that is $H_r$ contains higher information rate than $r_0$ 716, then the achievable data rate $d_u$ may reduced from the maximum at the red bar. Base station 114 may schedule the rate $d_u$ through link adaptation according to the rate of $H_r$. Since it is assumed in FIG. 7 that $H_r$ is Gaussian and optimally coded, the MAC model may provide an upper bound estimate, although the scope of the claimed subject matter is not limited in this respect.

Figure 8:
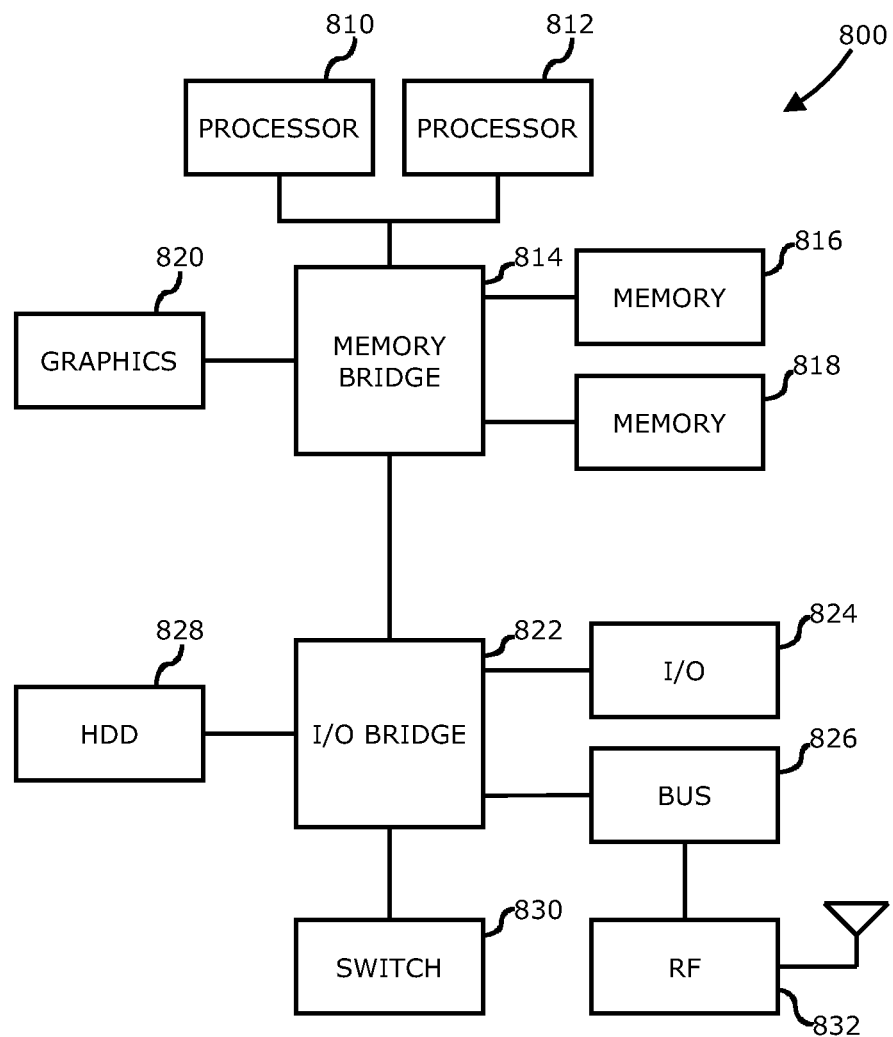
FIG. 8 is a block diagram of an information handling system capable of realizing one or more network elements of a wireless network in accordance with one or more embodiments.

Referring now to FIG. 8, a block diagram of an information-handling system capable of realizing one or more network elements of a wireless network in accordance with one or more embodiments will be discussed. Information-handling system 800 of FIG. 8 may tangibly embody one or more of any of the network elements of network 100 as shown in and described with respect to FIG. 1 through FIG. 6. For example, information-handling system 700 may represent the hardware of base station 114, subscriber station 116, and/or one or more of relay stations 210, 310, 312, and/or destination station 212, with greater or fewer components depending on the hardware specifications of the particular device or network element. Although information-handling system 800 represents one example of several types of computing platforms, information-handling system 800 may include more or fewer elements and/or different arrangements of elements than shown in FIG. 8, and the scope of the claimed subject matter is not limited in these respects.

Information-handing system 800 may comprise one or more processors, such as processor 810 and/or processor 812, which may comprise one or more processing cores. One or more of processor 810 and/or processor 812 may couple to one or more memories 816 and/or 818 via memory bridge 814, which may be disposed external to processors 810 and/or 812, or alternatively at least partially disposed within one or more of processors 810 and/or 812. Memory 816 and/or memory 818 may comprise various types of semiconductor-based memory, for example, volatile-type memory and/or non-volatile-type type memory. Memory bridge 814 may couple to a graphics system 820 to drive a display device (not shown) coupled to information-handling system 800.

Information-handling system 800 may further comprise input/output (I/O) bridge 822 to couple to various types of I/O systems. I/O system 824 may comprise, for example, a universal serial bus (USB) type system, an IEEE 1394 type system, or the like, to couple one or more peripheral devices to information handling system 800. Bus system 826 may comprise one or more bus systems, such as a peripheral component interconnect (PCI) express type bus or the like, to connect one or more peripheral devices to information-handling system 800. A hard disk drive (HDD) controller system 828 may couple one or more hard disk drives or the like to information-handling system, for example, Serial ATA type drives or the like, or alternatively a semiconductor-based drive comprising flash memory, phase change, and/or chalcognide-type memory or the like. Switch 830 may be utilized to couple one or more switched devices to I/O bridge 822, for example, Gigabit Ethernet type devices or the like. Furthermore, as shown in FIG. 8, information-handling system 500 may include a radio-frequency (RF) block 832 comprising RF circuits and devices for wireless communication with other wireless communication devices and/or via wireless networks, such as network 100 of FIG. 1, for example, in which information-handling system 800 embodies base station 114 and/or subscriber station 116, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to interference mitigation by overhearing and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
   receiving at a first station from a base station a first downlink packet intended for another station by overhearing the transmission of the first packet;
   decoding the first packet at the first station;
   transmitting from the first station to the base station an acknowledgement that the first downlink packet was successfully decoded;
   receiving at the first station a first uplink packet and a retransmission of the first packet as a total signal, the first uplink packet being intended for the first station and being transmitted by a third station, the base station designating the first station to receive the first uplink packet in response to the acknowledgement transmitted by the first station that the first downlink packet was successfully decoded, and the retransmission of the first downlink packet being from the base station and intended for the another station;
   subtracting at the first station the decoded first packet from the total signal to provide a resulting signal; and
   decoding at the first station the first uplink packet from the resulting signal.

2. The method according to claim 1, further comprising storing the decoded first packet to be utilized in a subsequent time slot.

3. The method according to claim 1, wherein transmitting the acknowledgement that the first packet was successfully decoded further provides an indication that the decoded first packet is able to be utilized for interference mitigation in a subsequent time slot.

4. The method according to claim 1, wherein the third station comprises a mobile station.

5. The method according to claim 1, wherein the first station comprises a relay station.

6. A mobile station, comprising:
   a processor and a radio-frequency circuit coupled to the processor, wherein the processor is capable of:
   receiving at the mobile station from a base station a first downlink packet intended for another station by overhearing the transmission of the first packet;
   decoding the first packet at the mobile station;
   transmitting from the mobile station to the base station an acknowledgement that the first downlink packet was successfully decoded;
   receiving at the mobile station a first uplink packet and a retransmission of the first packet as a total signal, the first uplink packet being intended for the mobile station and being transmitted by a third station, the base station designating the mobile station to receive the first uplink packet in response to the acknowledgement transmitted by the mobile station that the first downlink packet was successfully decoded, and the retransmission of the first downlink packet being from the base station and intended for the another station;
   subtracting the decoded first packet from the total signal to provide a resulting signal; and
   decoding the first uplink packet from the resulting signal.

7. The mobile station according to claim 6, wherein the processor is further capable of storing the decoded first packet to be utilized in a subsequent time slot.

8. The mobile station according to claim 6, wherein the acknowledgement that the first packet was successfully decoded further provides an indication that the decoded first packet is able to be utilized for interference mitigation in a subsequent time slot.

9. The mobile station according to claim 6, wherein the mobile station comprises a relay station.

* * * * *